United States Patent [19]

Mori et al.

[11] Patent Number: 4,985,381

[45] Date of Patent: Jan. 15, 1991

[54] DIELECTRIC CERAMIC COMPOSITION

[75] Inventors: Yoshiaki Mori, Nagaokakyo; Masaru Fujino, Takatsuki; Hiroshi Takagi, Otsu; Yukio Sakabe, Kyoto, all of Japan

[73] Assignee: Murata Manufacturing Co., Ltd., Japan

[21] Appl. No.: 483,052

[22] Filed: Feb. 21, 1990

[30] Foreign Application Priority Data

Feb. 23, 1989 [JP] Japan ................... 1-44730

[51] Int. Cl.$^5$ ............... C04B 35/46; C04B 35/48
[52] U.S. Cl. ................... 501/136; 501/134; 252/62.9
[58] Field of Search ............. 501/134, 136, 138; 252/62.9

[56] References Cited

U.S. PATENT DOCUMENTS

| 4,582,814 | 4/1986 | Thomas | 501/136 |
| 4,744,972 | 5/1988 | Ogata et al. | 501/134 |

FOREIGN PATENT DOCUMENTS

| 60042277A | 11/1983 | Japan | 501/134 |
| 60-033261 | 2/1985 | Japan | 501/134 |
| 60-036371 | 2/1985 | Japan | 501/134 |
| 60-046965 | 3/1985 | Japan | 501/134 |
| 0474519 | 6/1975 | U.S.S.R. | 501/134 |
| 0504736 | 2/1976 | U.S.S.R. | 501/134 |

Primary Examiner—William R. Dixon, Jr.
Assistant Examiner—Deborah Jones
Attorney, Agent, or Firm—Ostrolenk, Faber, Gerb & Soffen

[57] ABSTRACT

A dielectric ceramic composition consists essentially of a basic composition of a ternary system, $Pb(Mg_{\frac{1}{2}}W_{\frac{1}{2}})O_3$-$PbTiO_3$-$PbZrO_3$, and 0.05 to 6.5 wt % of an antireducing agent incorporated therein. The basic composition comprises a main component represented by the general formula: $xPb(Mg_{\frac{1}{2}}; W_{\frac{1}{2}})O_3$-$yPbTiO_3$-$zPbZrO_3$ wherein x, y and z are mole percentages of the respective components, and 0.3 to 2.0 wt % of ZnO contained therein. The main component has a composition falling within the area of a polygon ABCD defined by points A(52.0, 44.0, 4.0), B(47.0, 38.3, 15.0), C(44.0, 40.0, 16.0), D(49.0, 46.0, 5.0) in the attached figure. The antireducing agent has a composition expressed by the general formula:

$$\alpha Li_2O + \beta RO + \gamma B_2O_3 + (1-\alpha-\beta-\gamma)SiO_2$$

wherein RO is at least one oxide selected from the group consisting of BaO, CaO, SrO and MgO, $\alpha$, $\beta$ and $\gamma$ are mole fracions of the respective components and take each value within the following respective ranges, $0 < \alpha < 0.2$, $0.1 \leq \beta < 0.55$, $0 < \gamma < 0.4$. The main component may contain manganese oxide in an amount of not more than 2.0 wt % in terms of $MnO_2$.

2 Claims, 1 Drawing Sheet

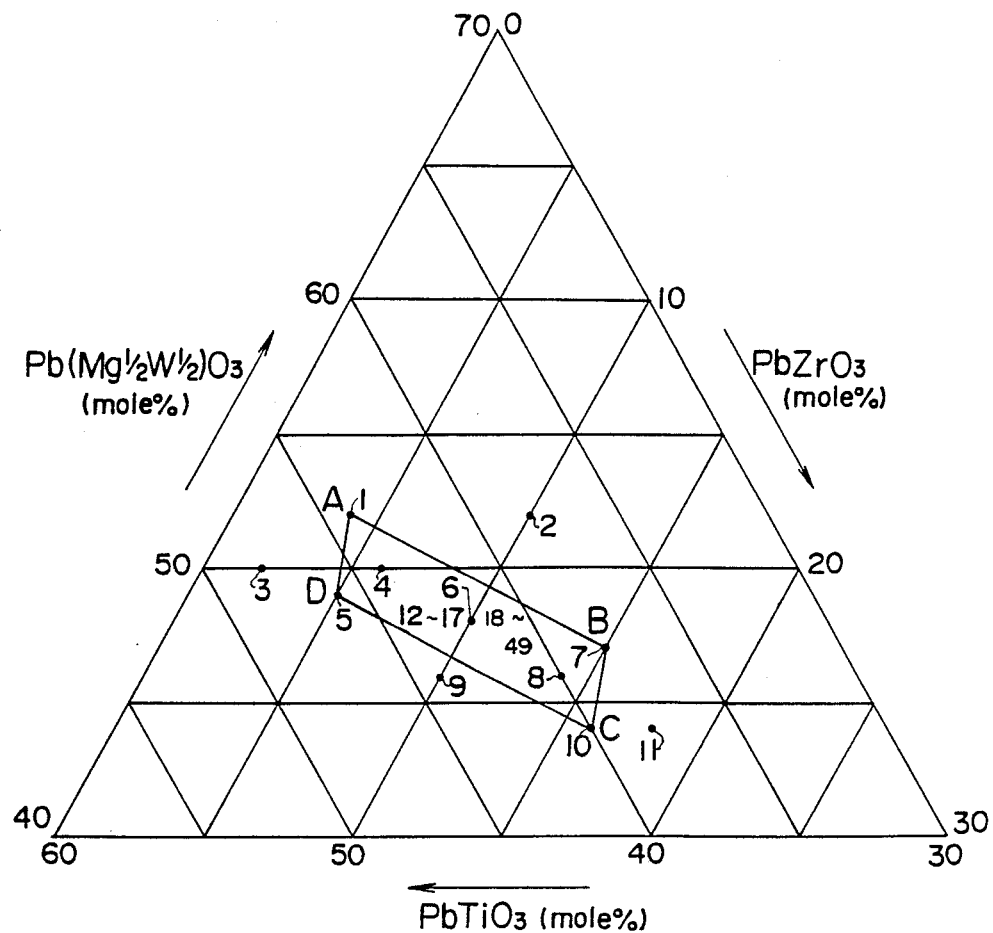

DIELECTRIC CERAMIC COMPOSITION

FIELD OF THE INVENTION

The present invention relates to a dielectric ceramic composition and, more particularly, a dielectric ceramic composition with a high dielectric constant of 2500, and small change rate of capacitance on temperature, and high specific resistance of not less than $10^{10}$ Ωcm.

BACKGROUND OF THE INVENTION

As a high permittivity ceramic material for capacitors, there have been proposed various dielectric ceramic compositions mainly comprising barium titanate. For example, Japanese Pat. laid open No. 58-60671 discloses a dielectric ceramic composition of a ternary system, $Pb(Mg_{\frac{1}{2}}W_{\frac{1}{2}})O_3-PbTiO_3-PbZrO_3$. Such a dielectric ceramic composition makes it possible to produce ceramic capacitors with a small change rate of capacitance on temperature, which meets B characteristics established by Japanese Industrial Standard (JIS), but its dielectric constant is small at room temperature and of the order of about 2000, thus making it difficult to produce ceramic capacitors with a large capacitance-to-volume ratio.

On the other hand, there have been known complex perovskite lead compound dielectric ceramic compositions having a dielectric constant of not less than 10000 and a low sintering temperature of not more than 1050° C. However, if such a composition is applied to monolithic ceramic capacitors, they have a large temperature change rate of capacitance ranging from −50% to +30% in the operating temperatures of −25° C. to +85° C.

Thus, there is an increasing demand of development of a dielectric ceramic composition with a small temperature change rate of capacitance and high dielectric constant.

The ceramic capacitors are generally produced by the steps of preparing ceramic green sheets, forming a metal paste layer for an internal electrode on one flat surface of each ceramic green sheet, stacking and pressing the green sheets to form a multilayer green ceramic body, and firing it to form a monolithic sintered ceramic body with internal electrodes. The dielectric ceramic composition containing lead compounds is generally fired in an oxidizing atmosphere as its insulating characteristics are lowered when fired in a reducing atmosphere. Since internal electrodes are fired together with the dielectric ceramic composition, a material for internal electrodes is required to have a high resistance to oxidation and high melting point, as well as not to react with the dielectric ceramic material during firing. To this end, noble metals such as platinum, or noble metal alloys such as silver-palladium alloys have been used as a material for internal electrodes.

However, the use of noble metals results in increase of production cost of the monolithic ceramic capacitors. If a silver-palladium alloy is used as a material for the internal electrodes, it causes migration of silver into the ceramic dielectric layers, resulting in lowering of the electrical characteristics of the produced capacitors. In addition, the silver-palladium alloy causes increase in equivalent series resistance of the capacitor because of its low conductivity.

To solve these problems, use of copper or copper alloys as a material for internal electrodes are considered as these materials are high in conductivity but low in price. However, the dielectric material is required to be fired in a reducing atmosphere at a low temperature as copper and its alloys have a low melting point and are easily oxidized in the oxidizing atmosphere. For these reasons, it is required to develop a dielectric ceramic composition which possesses high dielectric constant and a high specific resistance even if fired in a reducing atmosphere.

SUMMARY OF THE INVENTION

It is therefore an object of the present invention to provide a dielectric ceramic composition having a high dielectric constant, a small change rate of capacitance on temperature, and high specific resistance even if fired in a reducing atmosphere.

These and other object of the present invention are achieved by providing a dielectric ceramic composition consisting essentially of a basic composition of a ternary system, $Pb(Mg_{\frac{1}{2}}W_{\frac{1}{2}})O_3-PbTiO_3-PbZrO_3$, and 0.05 to 6.5 wt% of an antireducing agent incorporated therein, said basic composition comprising a main component represented by the general formula:

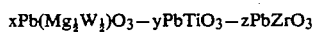

$$xPb(Mg_{\frac{1}{2}}W_{\frac{1}{2}})O_3-yPbTiO_3-zPbZrO_3$$

wherein x, y and z are mole percentages of the respective components, and 0.3 to 2.0 wt% of ZnO contained therein as an additive, said main component having a composition falling within the area of a polygon ABCD defined by points A(52.0, 44.0, 4.0), B(47.0, 38.0, 15.0), C(44.0, 40.0, 16.0), D(49.0, 46.0, 5.0) in the attached FIGURE, said antireducing agent having a composition expressed by the general formula:

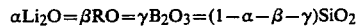

$$\alpha Li_2O = \beta RO = \gamma B_2O_3 = (1-\alpha-\beta-\gamma)SiO_2$$

wherein RO is at least one oxide selected from the group consisting of BaO, CaO, SrO and MgO, α, β and γ are mole fractions of the respective components and take each value within the following respective ranges, $0 < \alpha < 0.2$, $0.1 \leq \beta < 0.55$, $0 < \gamma < 0.4$.

The main component may contain manganese oxide as a part of the additive in an amount of not more than 2.0 wt% in terms of $MnO_2$. According to the present invention, therefore, there is also provided a dielectric ceramic composition consisting essentially of a basic composition of a ternary system, $Pb(Mg_{\frac{1}{2}}W_{\frac{1}{2}})O_3-PbTiO_3-PbZrO_3$, and 0.05 to 6.5 wt% of an antireducing agent incorporated therein, said basic composition consisting essentially of a main component represented by the general formula:

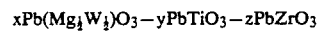

$$xPb(Mg_{\frac{1}{2}}W_{\frac{1}{2}})O_3-yPbTiO_3-zPbZrO_3$$

wherein x, y and z are mole percentages of the respective components, and an additive composed of 0.3 to 2.0 wt% of ZnO and a small amount of manganese oxide, the content of said manganese oxide in said main component being not more than 2.0 wt% in terms of $MnO_2$, said main component having a composition falling within the area of a polygon ABCD defined by points A(52.0, 44.0, 4.0), B(47.0, 38.0, 15.0), C(44.0, 40.0, 16.0), D(49.0, 46.0, 5.0) in the attached drawing, said antireducing agent having a composition expressed by the general formula:

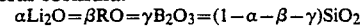

$$\alpha Li_2O = \beta RO = \gamma B_2O_3 = (1-\alpha-\beta-\gamma)SiO_2$$

wherein RO is at least one oxide selected from the group consisting of BaO, CaO, SrO and MgO, $\alpha$, $\beta$ and $\gamma$ are mole fractions of the respective components and take each value within the following respective ranges; $0<\alpha<0.2$, $0.1\leq\beta<0.55$, $0<\gamma<0.4$.

The dielectric ceramic composition according to the present invention has a high dielectric constant of not less than 2500 and a small change rate of capacitance on temperature, which meets B characteristics established by JIS. In addition, the composition of the present invention possesses high specific resistance of $10^{10}$ $\Omega$cm and small dielectric loss of not more than 5% as the composition is scarcely reduced even if fired in a reducing atmosphere such that copper is not oxidized.

The antireducing agent lowers the sintering temperature of the basic dielectric ceramic composition to 900° to 1050° C and prevents it from reduction during firing in a reducing atmosphere. Thus, the incorporation of the antireducing agent makes it possible to use copper or a copper alloy as a material for internal electrodes, which in turn makes it possible to prevent the ceramic dielectric layer from migration of the internal electrode material, as well as to produce monolithic ceramic capacitors at low cost.

The addition of ZnO with or without manganese oxides to the main component enables to lower the dielectric loss, as well as to improve the specific resistance.

The above and other objects, features and advantages of the present invention will become apparent from the following description, taken in connection with examples and the accompanying drawings.

BRIEF DESCRIPTION OF THE DRAWINGS

FIGURE is a ternary phase diagram showing the region of composition for the main component of the dielectric ceramic composition according to the present invention.

EXAMPLE 1

Using $Pb_3O_4$, MgO, $WO_3$, $TiO_2$, $ZrO_2$, ZnO and $MnO_2$ as raw materials, there were prepared mixtures of raw materials to produce ceramic dielectrics each having a composition shown in Table 1A. Each resultant mixture was milled with a ball mill by the wet process for 16 hours and then dried by evaporation. The resultant mixed powder was placed in a zirconia saggar, calcined at 680° C for 2 hours, crushed and then ground to prepare calcined powder of the complex perovskite lead compound ceramic dielectric having such particle size that particles may pass through a 200 mesh sieve screen.

Separate from the above, using $Li_2CO_3$, $BaCO_3$, $CaCO_3$, $SrCO_3$, MgO, $B_2O_3$, $SiO_2$ as raw materials, there was prepared a mixture of raw materials to produce powder of an antireducing agent consisting of 5 mol% of $Li_2O$, 15 mol% of BaO, 15 mol% of CaO, 10 mol% of SrO, 5 mol% of MgO, 20 mol% of $B_2O_3$ and 30 mol% of $SiO_2$. The resultant mixture was milled with a ball mill by the wet process for 16 hours and then dried by evaporation. The resultant mixed powder was put into an alumina crucible, maintained at 1300° C for 1 hour, vitrified by rapid cooling, and then ground to prepare powder of the antireducing agent having such particle size that particles may pass through a 200 mesh sieve screen.

The above ceramic dielectric powder and antireducing agent were mixed in proportions shown in Table 1A. Each of the resultant mixture was wet-milled with a ball mill for 16 hours together with a suitable amount of polyvinyl butyral binder and an organic solvent, formed into a sheet by the Doctor blade method, dried and then cut to prepare ceramic green sheets.

Each ceramic green sheet was provided on its one flat surface with a copper paste layer for an internal electrode by screen-printing with a copper paste containing copper powder of about 1 to 2 $\mu$m. Subsequently, 20 sheets of the resultant printed green sheets were stacked, pressed and then cut into green units for monolithic ceramic capacitors. The green units was provided on its opposite sides with copper layers for external electrodes by applying the copper paste, and then fired in an electric furnace at various temperatures ranging from 900° to 1050° C. for 2 hours in a reducing atmosphere to produce monolithic ceramic capacitors. The furnace was evacuated and then filled with a mixed gas of $N_2$, $H_2$ and $H_2O$. During firing, the furnace was supplied with 3000 1/hr of $N_2$, 0.1 1/hr of $H_2$, and 1350 1/hr of $H_2O$ to keep its atmosphere constant.

Some of the resultant monolithic ceramic capacitors were immersed in a fuchsin solution to determine the optimum firing temperature for each composition. Results are shown in Table 1B.

For each capacitor prepared by firing at the optimum firing temperature, measurements were made on electric characteristics including dielectric constant ($\epsilon$) at 25° C., 1 KHz and 1 Vrms, dielectric loss (tan $\delta$), specific resistance ($\rho$), and temperature characteristics of capacitance over the temperature range of $-25°$ C. to 85° C. relative to the capacitance at 20° C. (T.C.). Results are shown in Table 1B.

In Table 1B, the temperature characteristic of capacitance for each specimen is indicated by a symbol B, C, or D on the basis of classification established by JIS which are given as follows:

B characteristics: A temperature change rate of capacitance over the temperatures range of $-25°$ C. to $+85°$ C. relative to the capacitance at 20° C. ranges from $-10\%$ to $+10\%$;

C characteristics: A temperature change rate of capacitance over the temperatures range of $-25°$ C. to $+85°$ C. relative to the capacitance at 20° C. ranges from $-20\%$ to $+20\%$;

D characteristics: A temperature change rate of capacitance over the temperatures range of $-25°$ C to $+85°$ C relative to the capacitance at 20° C. ranges from $-30\%$ to $+20\%$.

In Tables 1A and 1B, specimens with an asterisk (*) are those out of the scope of the present invention, whereas other specimens are those falling in the scope of the present invention.

TABLE 1A

| No. | Antireducing agent (wt %) | Basic composition (wt %) | Basic composition | | | | |
|---|---|---|---|---|---|---|---|
| | | | Main component (mol %) | | | Additive (wt %) | |
| | | | $Pb(Mg_{\frac{1}{3}}W_{\frac{1}{3}})O_3$ | $PbTiO_3$ | $PbZrO_3$ | ZnO | $MnO_2$ |
| 1 | 1.00 | 99.00 | 52.0 | 44.0 | 4.0 | 0.8 | 0 |
| *2 | 6.00 | 94.00 | 52.0 | 38.0 | 10.0 | 0.8 | 0 |

TABLE 1A-continued

| | Antireducing agent (wt %) | Basic composition (wt %) | Basic composition | | | | |
|---|---|---|---|---|---|---|---|
| | | | Main component (mol %) | | | Additive (wt %) | |
| No. | | | Pb(Mg$_\frac{1}{2}$W$_\frac{1}{2}$)O$_3$ | PbTiO$_3$ | PbZrO$_3$ | ZnO | MnO$_2$ |
| *3 | 1.00 | 99.00 | 50.0 | 48.0 | 2.0 | 0.8 | 0 |
| 4 | 1.00 | 99.00 | 50.0 | 44.0 | 6.0 | 0.8 | 0 |
| 5 | 1.00 | 99.00 | 49.0 | 46.0 | 5.0 | 0.8 | 0 |
| 6 | 1.00 | 99.00 | 48.0 | 42.0 | 10.0 | 0.8 | 0 |
| 7 | 1.00 | 99.00 | 47.0 | 38.0 | 15.0 | 0.8 | 0 |
| 8 | 1.00 | 99.00 | 46.0 | 40.0 | 14.0 | 0.8 | 0 |
| *9 | 1.00 | 99.00 | 46.0 | 44.0 | 10.0 | 0.8 | 0 |
| 10 | 1.00 | 99.00 | 44.0 | 40.0 | 16.0 | 0.8 | 0 |
| *11 | 1.00 | 99.00 | 44.0 | 38.0 | 18.0 | 0.8 | 0 |
| *12 | 6.00 | 94.00 | 48.0 | 42.0 | 10.0 | 0.2 | 0 |
| 13 | 6.00 | 94.00 | 48.0 | 42.0 | 10.0 | 2.0 | 0 |
| *14 | 6.00 | 94.00 | 48.0 | 42.0 | 10.0 | 2.1 | 0 |
| 15 | 1.00 | 99.00 | 48.0 | 42.0 | 10.0 | 0.8 | 0.5 |
| 16 | 1.00 | 99.00 | 48.0 | 42.0 | 10.0 | 0.8 | 2.0 |
| *17 | 1.00 | 99.00 | 48.0 | 42.0 | 10.0 | 0.8 | 2.1 |

TABLE 1B

| No. | Firing temp.(°C.) | Electric characteristics | | | |
|---|---|---|---|---|---|
| | | ε | tan δ (%) | ρ (Ωcm) | T.C. |
| 1 | 990 | 5400 | 1.4 | ≧10$^{10}$ | B |
| *2 | 910 | 2480 | 1.8 | ≧10$^{10}$ | C |
| *3 | 980 | 5700 | 5.9 | 10$^9$ | D |
| 4 | 980 | 5650 | 1.4 | ≧10$^{10}$ | B |
| 5 | 980 | 5600 | 3.8 | ≧10$^{10}$ | B |
| 6 | 1000 | 5400 | 0.9 | ≧10$^{10}$ | B |
| 7 | 1030 | 5000 | 0.6 | ≧10$^{10}$ | B |
| 8 | 1010 | 5050 | 0.9 | ≧10$^{10}$ | B |
| *9 | 1000 | 5200 | 0.8 | ≧10$^{10}$ | D |
| 10 | 1030 | 5000 | 1.1 | ≧10$^{10}$ | B |
| *11 | 1030 | 4600 | 1.8 | ≧10$^{10}$ | D |
| *12 | 910 | 3000 | 5.4 | 10$^8$ | C |
| 13 | 910 | 2520 | 3.8 | ≧10$^{10}$ | B |
| *14 | 910 | 2480 | 4.0 | ≧10$^{10}$ | B |
| 15 | 1000 | 5200 | 0.8 | ≧10$^{10}$ | B |
| 16 | 1000 | 5000 | 4.8 | ≧10$^{10}$ | B |
| *17 | 1000 | 5000 | 5.2 | ≧10$^{10}$ | B |

From the results shown in Table 1B, it will be seen that the dielectric ceramic composition according to the present invention have a dielectric constant of 2500 and a high specific resistance of not less than 10$^{10}$ Ωcm. Further, the composition of the present invention can be sintered at a low temperature ranging from 900° to 1050° C. in a reducing atmosphere without causing oxidation of copper used for internal electrodes. In addition, the composition of the present invention makes it possible to produce monolithic ceramic capacitors, which meet the B characteristics established by JIS.

EXAMPLE 2

Using the same raw materials as those used in Example 1, there was prepared powder of a ceramic dielectric having a composition consisting essentially of 48 mol% of Pb(Mg$_\frac{1}{2}$W$_\frac{1}{2}$)O$_3$, mol% of PbTiO$_3$, and 10 mol% of PbZrO$_3$, and containing 0.8 wt% of ZnO, in the same manner as in Example 1.

Separate from the above, there were prepared antireducing agents each having a composition shown in Table 2A in the same manner as in Example 1.

Using the thus prepared dielectric ceramic composition and antireducing agent, there were prepared monolithic ceramic capacitors in the same manner as in Example 1.

For each monolithic ceramic capacitor, the electrical characteristics were measured in the same manner as disclosed in Example 1. Results are shown in Table 2B.

TABLE 2A

| No. | Basic composition (wt %) | Antireducing agent (wt %) | Composition of antireducing agent (mol %) | | | | | | |
|---|---|---|---|---|---|---|---|---|---|
| | | | Li$_2$O | BaO | CaO | SrO | MgO | B$_2$O$_3$ | SiO$_2$ |
| *18 | 100 | 0 | — | — | — | — | — | — | — |
| *19 | 100 | 0 | — | — | — | — | — | — | — |
| *20 | 99.96 | 0.04 | 5 | 15 | 10 | 10 | 10 | 20 | 30 |
| 21 | 99.95 | 0.05 | 5 | 15 | 10 | 10 | 10 | 20 | 30 |
| 22 | 99.9 | 0.1 | 5 | 15 | 10 | 10 | 10 | 20 | 30 |
| 23 | 99.5 | 0.5 | 5 | 15 | 10 | 10 | 10 | 20 | 30 |
| 24 | 99.0 | 1.0 | 5 | 15 | 10 | 10 | 10 | 20 | 30 |
| *25 | 99.0 | 1.0 | 5 | 55 | 0 | 0 | 0 | 20 | 20 |
| *26 | 99.0 | 1.0 | 5 | 0 | 55 | 0 | 0 | 20 | 20 |
| *27 | 99.0 | 1.0 | 5 | 0 | 0 | 55 | 0 | 20 | 20 |
| *28 | 99.0 | 1.0 | 5 | 0 | 0 | 0 | 55 | 20 | 20 |
| 29 | 99.0 | 1.0 | 5 | 54 | 0 | 0 | 0 | 21 | 20 |
| 30 | 99.0 | 1.0 | 5 | 0 | 54 | 0 | 0 | 21 | 20 |
| 31 | 99.0 | 1.0 | 5 | 0 | 0 | 54 | 0 | 21 | 20 |
| 32 | 99.0 | 1.0 | 5 | 0 | 0 | 0 | 54 | 21 | 20 |
| *33 | 99.0 | 1.0 | 6 | 9 | 0 | 0 | 0 | 35 | 50 |
| *34 | 99.0 | 1.0 | 6 | 0 | 9 | 0 | 0 | 35 | 50 |
| *35 | 99.0 | 1.0 | 6 | 0 | 0 | 9 | 0 | 35 | 50 |
| *36 | 99.0 | 1.0 | 6 | 0 | 0 | 0 | 9 | 35 | 50 |
| 37 | 99.0 | 1.0 | 6 | 10 | 0 | 0 | 0 | 34 | 50 |
| 38 | 99.0 | 1.0 | 6 | 0 | 10 | 0 | 0 | 34 | 50 |
| 39 | 99.0 | 1.0 | 6 | 0 | 0 | 10 | 0 | 34 | 50 |
| 40 | 99.0 | 1.0 | 6 | 0 | 0 | 0 | 10 | 34 | 50 |

TABLE 2A-continued

| No. | Basic composition (wt %) | Antireducing agent (wt %) | Composition of antireducing agent (mol %) | | | | | | |
|---|---|---|---|---|---|---|---|---|---|
| | | | Li$_2$O | BaO | CaO | SrO | MgO | B$_2$O$_3$ | SiO$_2$ |
| *41 | 99.0 | 1.0 | 20 | 10 | 10 | 5 | 5 | 20 | 30 |
| 42 | 99.0 | 1.0 | 19 | 10 | 10 | 5 | 5 | 20 | 31 |
| *43 | 99.0 | 1.0 | 5 | 10 | 10 | 5 | 5 | 40 | 25 |
| 44 | 99.0 | 1.0 | 5 | 10 | 10 | 5 | 5 | 39 | 26 |
| 45 | 98.0 | 2.0 | 5 | 15 | 15 | 10 | 5 | 20 | 30 |
| 46 | 95.0 | 5.0 | 5 | 15 | 15 | 10 | 5 | 20 | 30 |
| 47 | 94.0 | 6.0 | 5 | 15 | 15 | 10 | 5 | 20 | 30 |
| 48 | 93.5 | 6.5 | 5 | 15 | 15 | 10 | 5 | 20 | 30 |
| *49 | 93.4 | 6.6 | 5 | 15 | 15 | 10 | 5 | 20 | 30 |

TABLE 2B

| No. | Firing temp.(°C.) | Electric characteristics | | | T.C. |
|---|---|---|---|---|---|
| | | ε | tan δ (%) | ρ (Ωcm) | |
| *18 | 1030 | — | — | — | — |
| *19 | 1030 | 1100 | 16.0 | 10$^6$ | B |
| *20 | 1030 | 5450 | 5.2 | 10$^9$ | C |
| 21 | 1030 | 5450 | 4.3 | ≥10$^{10}$ | B |
| 22 | 1030 | 5440 | 2.6 | ≥10$^{10}$ | B |
| 23 | 1020 | 5400 | 1.4 | ≥10$^{10}$ | B |
| 24 | 1000 | 5350 | 0.9 | ≥10$^{10}$ | B |
| *25 | ≥1050 | — | — | — | — |
| *26 | ≥1050 | — | — | — | — |
| *27 | ≥1050 | — | — | — | — |
| *28 | ≥1050 | — | — | — | — |
| 29 | 1040 | 5700 | 2.0 | ≥10$^{10}$ | B |
| 30 | 1040 | 5700 | 1.8 | ≥10$^{10}$ | B |
| 31 | 1040 | 5700 | 2.3 | ≥10$^{10}$ | B |
| 32 | 1040 | 5700 | 2.1 | ≥10$^{10}$ | B |
| *33 | 990 | 4100 | 5.4 | 10$^9$ | B |
| *34 | 990 | 4000 | 5.8 | 10$^9$ | B |
| *35 | 990 | 4000 | 5.4 | 10$^9$ | B |
| *36 | 990 | 4050 | 5.6 | 10$^9$ | B |
| 37 | 1000 | 4300 | 3.0 | ≥10$^{10}$ | B |
| 38 | 1000 | 4300 | 2.9 | ≥10$^{10}$ | B |
| 39 | 1000 | 4250 | 3.5 | ≥10$^{10}$ | B |
| 40 | 1000 | 4300 | 3.0 | ≥10$^{10}$ | B |
| *41 | 1000 | — | — | — | — |
| 42 | 1000 | 4800 | 2.8 | ≥10$^{10}$ | B |
| *43 | 1000 | — | — | — | — |
| 44 | 1000 | 4500 | 3.0 | ≥10$^{10}$ | B |
| 45 | 980 | 4800 | 0.9 | ≥10$^{10}$ | B |
| 46 | 930 | 3000 | 0.8 | ≥10$^{10}$ | B |
| 47 | 910 | 2800 | 0.8 | ≥10$^{10}$ | B |
| 48 | 900 | 2520 | 0.8 | ≥10$^{10}$ | B |
| *49 | 900 | 2490 | 0.8 | ≥10$^{10}$ | B |

As will be understood from the results shown in Table 2B, the monolithic ceramic capacitors according to the present invention have a large dielectric constant of not less than 2500, a high specific resistance of not less than 10$^{10}$ Ωcm, and a low sintering temperature of not more than 1050° C. Further, the present invention makes it possible to produce monolithic ceramic capacitors which meets the B characteristics defined by JIS.

In the present invention, the composition of the main component has been limited to those having a set of x, y and z, i.e., a set of mole percentages of the three components, Pb(Mg$_{\frac{1}{3}}$W$_{\frac{1}{3}}$)O$_3$, PbTiO$_3$ and PbZrO$_3$, falling within the polygon defined above for the following reasons. If the main component has a composition falling on any points out of the side AB of the polygon ABCD in the FIGURE, the dielectric constant becomes less than 2500 by incorporation of the antireducing agent, and the temperature change rate of capacitance of the capacitors does not meet the B characteristics defined by JIS (specimen No. 2).

If the main component has a composition falling on any points out of the side BC of the polygon ABCD, or if the main component have a composition falling on any points out of the side of CD of the polygon ABCD, the change rate of capacitance on temperature does not meet the B characteristics defined by JIS (specimen Nos. 9 and 11).

If the main component has a composition falling on a point out of the side DA of the polygon ABCD, like as specimen No. 3, the dielectric loss (tan δ) becomes greater than 5% and the specific resistance becomes lower than 10$^{10}$ Ωcm, by incorporation of the antireducing agent. Further, the change rate of capacitance on temperature does not meet the B characteristics defined by JIS.

The added amount of ZnO to be incorporated into the main component has been limited those ranging from 0.3 to 2.0 wt% for the following reasons. If the added amount of ZnO is less than 0.3 wt%, like as specimen No. 12, the dielectric loss (tan δ) becomes greater than 5% and the specific resistance becomes lower than 10$^{10}$ Ωcm even if the antireducing agent is incorporated into the basic composition. In addition, it is impossible to produce capacitors having a temperature change rate of capacitance which meets the B characteristics defined by JIS.

If the added amount of ZnO exceeds 2.0 wt%, like as specimen No. 14, the dielectric constant becomes smaller than 2500 by incorporation of the antireducing agent.

If the added amount of MnO$_2$ exceeds 2.0 wt%, the dielectric loss (tan δ) becomes larger than 5% even if when the antireducing agent is incorporated into the composition (specimen No. 17).

The antireducing agent has been limited to those having a composition defined above for the following reasons.

If the mole fraction of RO, i.e., β is less than 0.10 like as specimen Nos. 33, 34, 35 and 36, it is impossible to sinter the dielectric ceramics at a temperature of not more than 1050° C. in a reducing atmosphere with a low partial pressure of oxygen, for example, of about 0.1 ppm. In addition, the dielectric loss (tan δ) becomes larger than 5% and the specific resistance becomes lowered. If β exceeds 0.55 like as specimen Nos. 25, 26, 27 and 28, the sintering temperature becomes higher than 1050° C. so that copper for internal electrodes melts and flows out.

If the mole fraction of Li$_2$O, i.e, α is 0.20 and above like as specimen No. 41, or if the mole fraction of B$_2$O$_3$, i.e., γ is 0.40 and above like as specimen No. 43, the dielectric characteristics become considerably lowered and the dielectric ceramics becomes deformed before sintering.

The content of the antireducing agent in the dielectric ceramic composition has been limited to those ranging from 0.05 to 6.5 wt% for the following reasons. If the content of the antireducing agent is less than 0.05 wt% like as specimen Nos. 19 and 20, the specific resistance becomes lowered as reduction of the dielectric takes place during sintering. If the content of the antireducing agent exceeds 6.5 wt% like as specimen No. 49, the dielectric constant becomes less than 2500.

It is preferred that firing is carried out in an atmosphere with a partial pressure of oxygen of about 0.1 ppm and below. If the partial pressure of oxygen is higher than 0.1 ppm, oxidation of copper takes place, thus making it impossible to produce monolithic ceramic capacitors comprising internal electrodes of copper or a copper alloy.

The dielectric ceramic composition of the present invention has excellent electric and physical characteristics. They includes, (1) high dielectric constant of not less than 2500, (2) small temperature change rate of capacitance which meets the B characteristics established by JIS.

(3) high specific resistance of not less than $10^{10}$ $\Omega$cm (4) low sintering temperature of 900° to 1050° C.

(5) high resistance to reduction, i.e., the composition can be fired in an atmosphere with a low partial pressure of oxygen of about 0.1 ppm and below so that copper used as a material for electrodes is never oxidized.

Accordingly, the dielectric ceramic composition of the present invention makes it possible to produce monolithic ceramic capacitors with internal electrodes of copper or a copper alloy.

What is claimed is:

1. A dielectric ceramic composition consisting essentially of a basic composition of a ternary system, $Pb(Mg_{\frac{1}{2}}W_{\frac{1}{2}})O_3-PbTiO_3-PbZrO_3$, and 0.05 to 6.5 wt% of an antireducing agent incorporated therein, said basic composition comprising a main component represented by the general formula:

$$xPb(Mg_{\frac{1}{2}}W_{\frac{1}{2}})O_3-PbTiO_3-zPbZrO_3$$

wherein x, y and z are mole percentages of the respective components, and 0.3 to 2.0 wt% of ZnO contained therein as an additive, said main component having a composition falling within the area of a polygon ABCD defined by points A(52.0, 44.0, 4.0), B(47.0, 38.0, 15.0), C(44.0, 40.0, 16.0), D(49.0, 46.0, 5.0) in the FIGURE, said antireducing agent having a composition expressed by the general formula:

$$\alpha Li_2O + \beta RO + \gamma B_2O_3 + (1-\alpha-\beta-\gamma)SiO_2$$

wherein RO is at least one oxide selected from the group consisting of BaO, CaO, SrO and MgO, $\alpha$, $\beta$ and $\gamma$ are mole fractions of the respective components and take each value within the following respective ranges, $0<\alpha<0.2$, $0.1\leq\beta<0.55$, $0<\gamma<0.4$.

2. A dielectric ceramic composition claimed in claim 1 wherein said main component contains manganese oxide in an amount of not more than 2.0 wt% in terms of $MnO_2$.

* * * * *